United States Patent [19]

Hitomi et al.

[11] Patent Number: 5,443,050
[45] Date of Patent: Aug. 22, 1995

[54] ENGINE CONTROL SYSTEM

[75] Inventors: Mitsuo Hitomi; Junsou Sasaki; Tadayoshi Kaide, all of Hiroshima, Japan

[73] Assignee: Mazda Motor Corporation, Hiroshima, Japan

[21] Appl. No.: 12,067

[22] Filed: Feb. 1, 1993

[30] Foreign Application Priority Data

Jan. 31, 1992 [JP] Japan .................. 4-042117
Feb. 4, 1992 [JP] Japan .................. 4-047966

[51] Int. Cl.$^6$ .............................................. F02D 43/00
[52] U.S. Cl. .................. 123/492; 123/90.15; 123/681
[58] Field of Search .............. 123/90.15, 90.16, 90.17, 123/90.18, 295, 430, 681, 492

[56] References Cited

U.S. PATENT DOCUMENTS

| 3,911,873 | 10/1975 | Dave ................................ 123/302 |
| 4,499,872 | 2/1985 | Ward et al. .................. 123/90.18 X |
| 4,759,321 | 7/1988 | Matsumoto et al. ........... 123/90.15 |
| 5,083,533 | 1/1992 | Richeson et al. ............ 123/90.15 X |
| 5,121,733 | 6/1992 | Goto et al. ..................... 123/559.1 |
| 5,211,147 | 5/1993 | Ward .............................. 123/430 X |
| 5,309,886 | 5/1994 | Hitomi et al. ................... 123/570 |

FOREIGN PATENT DOCUMENTS

58-25514 2/1983 Japan .
63-195325 8/1988 Japan .
2-119621 5/1990 Japan .

*Primary Examiner*—Tony M. Argenbright
*Attorney, Agent, or Firm*—Fish & Richardson

[57] ABSTRACT

An engine-control system is structured in such a way that a timing for closing the intake valve is retarded and the air-fuel ratio is so set as to become a rich air-fuel ratio richer than, for example, the stoichiometric air-fuel ratio, in a region where the load is low. On the other hand, in a region where the load is high, the timing for closing the intake valve is set earlier and the air-fuel ratio is so set as to become a lean air-fuel ratio leaner than, for example, the stoichiometric air-fuel ratio.

32 Claims, 11 Drawing Sheets

ENGINE CONTROL SYSTEM

BACKGROUND OF THE INVENTION

1. Field of the Invention

The present invention relates to an engine control system and, more particularly, to an engine control system adapted to change a timing for closing an intake valve in accordance with a state of running the engine.

2. Description of the Related Art

Japanese Patent Unexamined Publication (kokai) No. 63-195,325 discloses an internal combustion engine adapted to lower an effective compression ratio by retarding the timing for closing an intake valve of the engine.

Japanese Patent Examined Publication (kokoku) No. 2-36,772. discloses a so-called lean burn engine adapted to set an absolutely lean air-fuel ratio in which the air-fuel ratio is made leaner than the stoichiometric air-fuel ratio.

It should be noted that the lean burn engine is required to make a compression ratio higher in order to ensure a high degree of ignitability. However, when the compression ratio of the engine is made higher, the problem may arise that the higher the compression ratio, the more difficult it becomes to start the engine. More specifically, when an attempt is made to restart the engine in a warm state after it has once been suspended temporarily, it is necessary to further compress the highly pressurized gases existing in the cylinders. Accordingly, to restart the engine, a large amount of force is required so that a higher power is needed in order to set the higher compression ratio. This problem may occur more or less even in a relatively low compression ratio.

SUMMARY OF THE INVENTION

Therefore, an object of the present invention is to provide an engine-control system adapted to solve the problem that arises from making the compression ratio of the engine higher, that is, the problem with the locking that is caused at the time of starting up the temporarily suspended engine in a warm state.

In order to achieve the aforesaid object, the present invention consists of an engine-control system, comprising:

- load detecting means for detecting a load of the engine;
- valve timing changing means for changing a timing for closing at least an intake valve;
- air-fuel ratio adjusting means for adjusting an air-fuel ratio of mixed gases to be fed to the engine;
- first control means for controlling the valve timing changing means in response to output from the load detecting means to thereby retard the timing for closing the intake valve in a region where the load is lower than where the load is higher; and
- second control means for controlling the air-fuel ratio adjusting means in response to output from the load detecting means to thereby make the air-fuel ratio rich in the region where the load is lower than where the load is higher.

For the engine-control system according to the present invention, the effective compression ratio of the engine can be reduced by retarding the timing for closing the intake valves in a region where the load is low. Hence, even if the compression ratio of the engine would be made higher at the time of restarting the engine in the warm state, the pressure for compression can be sustained at a relatively low level, thereby preventing the occurrence of a so-called locking during the warm time of the engine.

Further, the risk of a poor stability in combustion due to a decrease in the effective compression ratio can be avoided by controlling the air-fuel ratio for setting a rich air-fuel ratio.

It should, however, be noted herein that, when the compression ratio of the engine is made higher by improvements in the locking of the engine during the warm time, a ratio of expansion of mixed gases becomes higher, too, due to the higher compression ratio. As a result, the temperature of exhaust gases discharged from the engine becomes lower and this may cause difficulty in activating a catalyst for purifying the exhaust gases in a region where the load is low, due to the too low temperature of the exhaust gases. For the engine control system according to the present invention, however, a state of burning the mixed gases is made slower on account of the decrease in the effective compression ratio to be caused by retarding the timing for closing the intake valves in the region where the load is low, thereby making the temperature of the exhaust gases to be discharged from the engine higher and, as a result, solving the problem as described hereinabove.

On the other hand, in a region where the load is high, the intake valves are closed at an earlier timing so that the effective compression ratio can be made higher and, at the same time, a rate of residual gases remaining within the cylinders of the engine is caused to decrease to a relatively low extent on account of an increase in the inner pressure within an intake tube, thereby allowing the lean limit of the mixed gases to extend to a larger extent. Hence, stability in combustion cannot be lost even if the lean air-fuel ratio would be set in the region where the load is high.

The engine-control system according to the present invention, accordingly, can make the compression ratio of the engine higher even if no problem with the so-called locking during the warm time of the engine is caused to occur and it can improve the ability of purifying the exhaust gases in the region where the load is low, although the worsening of the purification of the exhaust gases is caused for the engine with the higher compression ratio. Further, the engine-control system according to the present invention can improve mileage or fuel economy by making the air-fuel ratio lean in the region where the load is high.

Other objects, features and advantages of the present invention will become apparent during the course of the description of the preferred embodiments, which follows, with reference to the accompanying drawings.

DESCRIPTION OF THE PREFERRED EMBODIMENTS

The present invention will be described more in detail by way of examples with reference to the accompanying drawings.

First Embodiment (FIGS. 1 to 4)

FIGS. 1 to 4 are directed to the first embodiment of the engine-control system according to the present invention.

Figure 1:
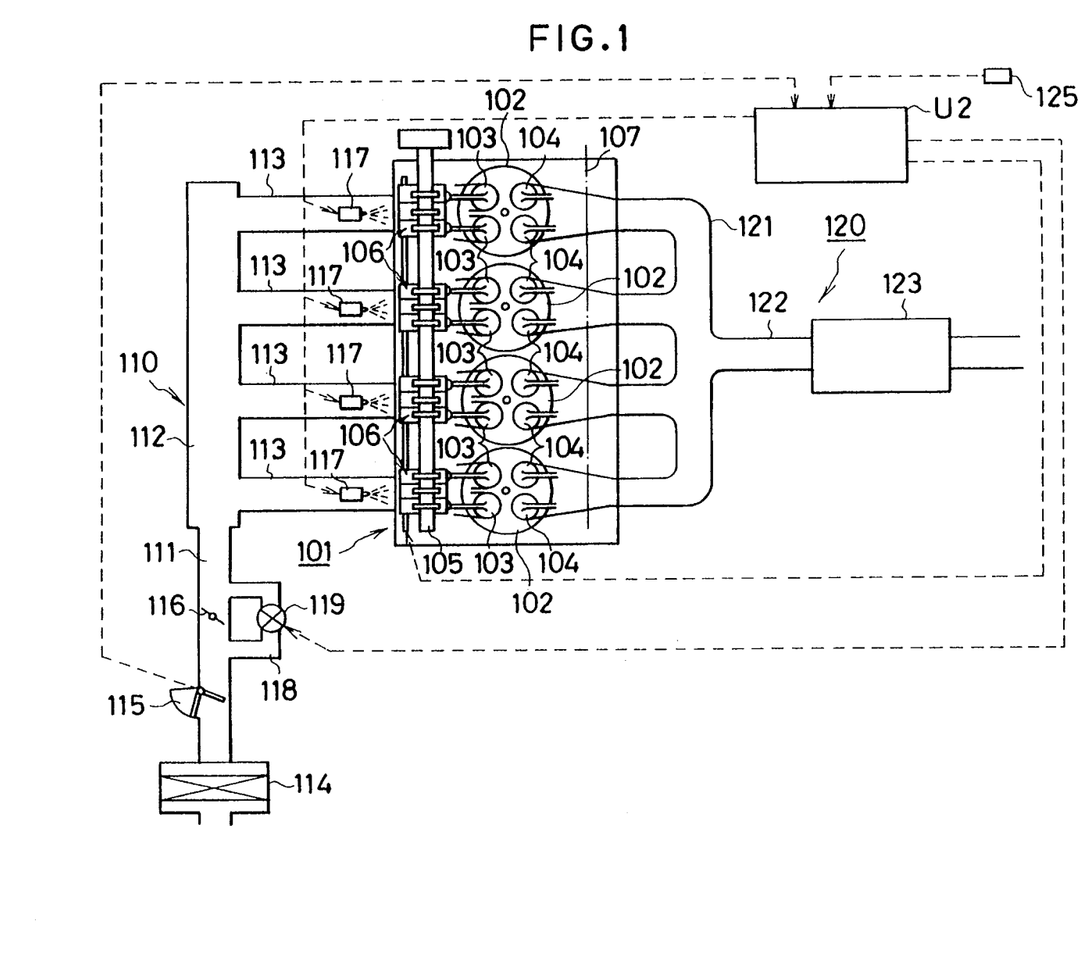
FIG. 1 is a diagrammatic representation showing an entire structure of the engine according to a first embodiment of the present invention.

As shown in FIG. 1, reference numeral 101 denotes an internal combustion engine, and the engine 101 to be employed for the first embodiment of the present invention is an in-line 4-cylinder engine in which the engine 101 is provided with four cylinders 102 which are arranged in line, or in a row. Each of the four cylinders 102 is provided with two intake ports having an opening at a combustion chamber (not shown), and two exhaust ports. Each of the intake ports is arranged so as to be opened and closed with intake valves 103, and each of the exhaust ports is arranged so as to be opened and closed with exhaust valves 104.

A description will now be made of a power valve system for opening and closing the intake valves 103 and the exhaust valves 104. Each of the intake valves 103 is arranged so as to be capable of being shifted between a first timing and a second timing, as will be described hereinafter, with a valve timing variable mechanism 106 mounted to an intake cam shaft 105. On the other hand, each of the exhaust valves 104 is arranged so as to be opened and closed with an exhaust cam shaft 107 at a predetermined timing in synchronization with the rotation of an engine output shaft.

Now, a description will be made of the valve timing of the intake valves 103. It can be noted herein that the first timing may be set in such a manner that the intake valves 103 are opened at 5 deg before top dead center and they are closed at 50 deg after bottom dead center. On the other hand, the second timing may be set in such a manner that the intake valves 103 are opened at 5 deg before top dead center and they are closed at 80 deg after bottom dead center. In other words, the intake valves 103 are closed relatively earlier at the first timing, on the one hand, and they are closed in a retarded way at the second timing, on the other hand.

Further, the valve timing for the exhaust valves 104 is such that they are closed at 5 deg after top dead center and opened at 50 deg before bottom dead center.

An intake system 110 of the engine 101 comprises a common intake passage 111, a surge tank 112 functioning as an intake expansion chamber, and a discrete intake passage 113 disposed discretely for each of the cylinders. The common intake passage 111, the surge tank 112, and the discrete intake passage 113 are arranged in this order from the upstream side to the downstream side. Further, the common intake passage 111 has an air cleaner 114, an air flowmeter 115, and a throttle valve 116 arranged in the order from the upstream side to the downstream side. In addition, the common intake passage 111 is provided with a bypass 118 bypassing the throttle valve 116, and the bypass 118 is provided with an ISC valve 119 as a bypass valve for controlling the idle rotation rate of the engine. The control of of idle rotation rate of the engine by the ISC valve 119 can be made in a conventional manner. Each discrete intake passage 113 is provided with a fuel injection valve 117.

On the other hand, an exhaust system 120 of the engine 1 may comprise an exhaust manifold 121 and a common exhaust passage 122. The common exhaust passage 122 has a ternary catalyst 123 and a silencer (not shown), and so on, arranged in this order from the upstream side to the downstream side.

As shown in FIG. 1, reference symbol U2 denotes a control unit which may mainly comprise a microcomputer composed of a CPU, a ROM, a RAM, and so on. The control unit U2 is fed with a signal indicative of an amount of intake air from the air flowmeter 115 and with the signals indicative of the rate of engine rotation, a load of the engine, and so on, from a group of sensors 125. On the other hand, the control unit U2 generates control signals to the fuel injection valve 117, the ISC valve 119, the exhaust valve timing variable mechanism 116, and so on.

Valve Timing for Intake Valves

Figure 2:
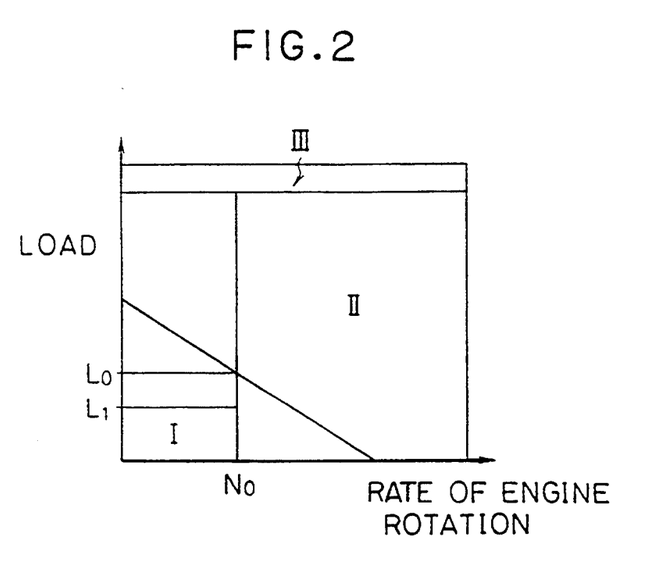
FIG. 2 shows a control map to be employed for controlling the engine-control system according to the first embodiment of the present invention.

The valve timing of the intake valves 103 are controlled on the basis of a map as shown in FIG. 2, which region I is a region where the load is low and the rate of engine rotation is low; region II is a region where the load is high, and region III is a region where the load is substantially full open and in which different valve timings are set for the three regions as described hereinabove.

Now, a description will be made of the valve timings to be set in the regions I, II and III.

1. Region I

In the region I where the load is low and the rate of engine rotation is low, the second timing is selected as the valve timing of the intake valves 103, thereby retarding the timing for closing the intake valves 103 and reducing the effective compression ratio of the engine.

2. Region II

In the Region II where the load is high, the first timing is selected as the valve timing, thereby closing the intake valves 103 at a relatively earlier timing.

3. Region III

In the region III where the load is substantially full open, the first timing is selected as the valve timing.

Control of Air-fuel Ratio

The air-fuel ratios can be controlled on the basis of the control map as shown in FIG. 2. The air-fuel ratios to be set in the regions I and II will be described on the basis of FIG. 3. It should be noted herein that a description of the specific procedures for controlling the air-fuel ratios will be omitted because they are substantially the same as conventional procedures.

Region I

Figure 3:
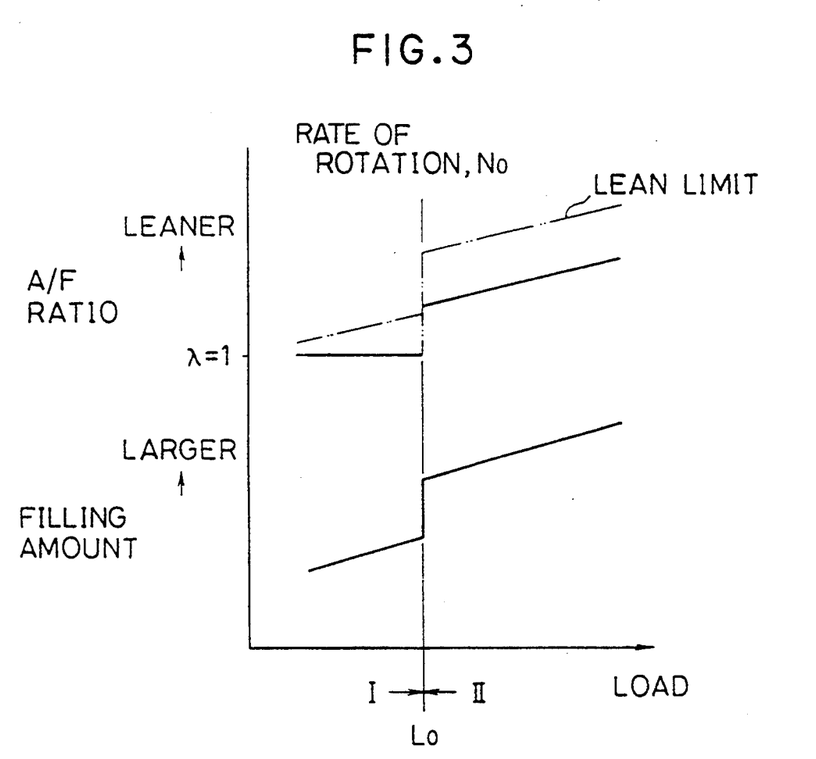
FIG. 3 shows a characteristic diagram at the number of engine rotation, No, as shown in FIG. 2.

In the region I where the load is low and the rate of engine rotation is low, the stoichiometric air-fuel ratio ($\lambda=1$) is set as shown in FIG. 3 indicative of the characteristics at the rate of engine rotation, No.

Region II

The absolutely lean air-fuel ratio is set at the load, Lo, existing at the boundary between the region I and the region II. Further, the lean air-fuel ratio is set so as to become larger gradually, as shown in FIG. 3, as the load of the engine becomes larger than the load Lo. As shown in FIG. 3, the lean limit is indicated by two-dots-and-dash line, and the value of the air-fuel ratio in the region II is set so as to provide a predetermined margin for the lean limit.

On the other hand, the amount of the fuel to be injected from the fuel injector 117 is set so as to continuously increase as the load elevates in a transit region between the regions I and II. In other words, the lean air-fuel ratio at the load Lo is inevitably set on the basis of an increase in the amount of charging on account of changes of the timing for closing the intake valves 103 at an earlier timing.

Further, it can be noted herein that the air-fuel ratio in the region III can be set in substantially the same manner as that in the region II. In addition, the air-fuel ratio in the region III can be set so as to become richer than the air-fuel ratio in the region II, for example, to amount to $\lambda=1$, in order to place more importance upon the output from the engine.

Figure 4:
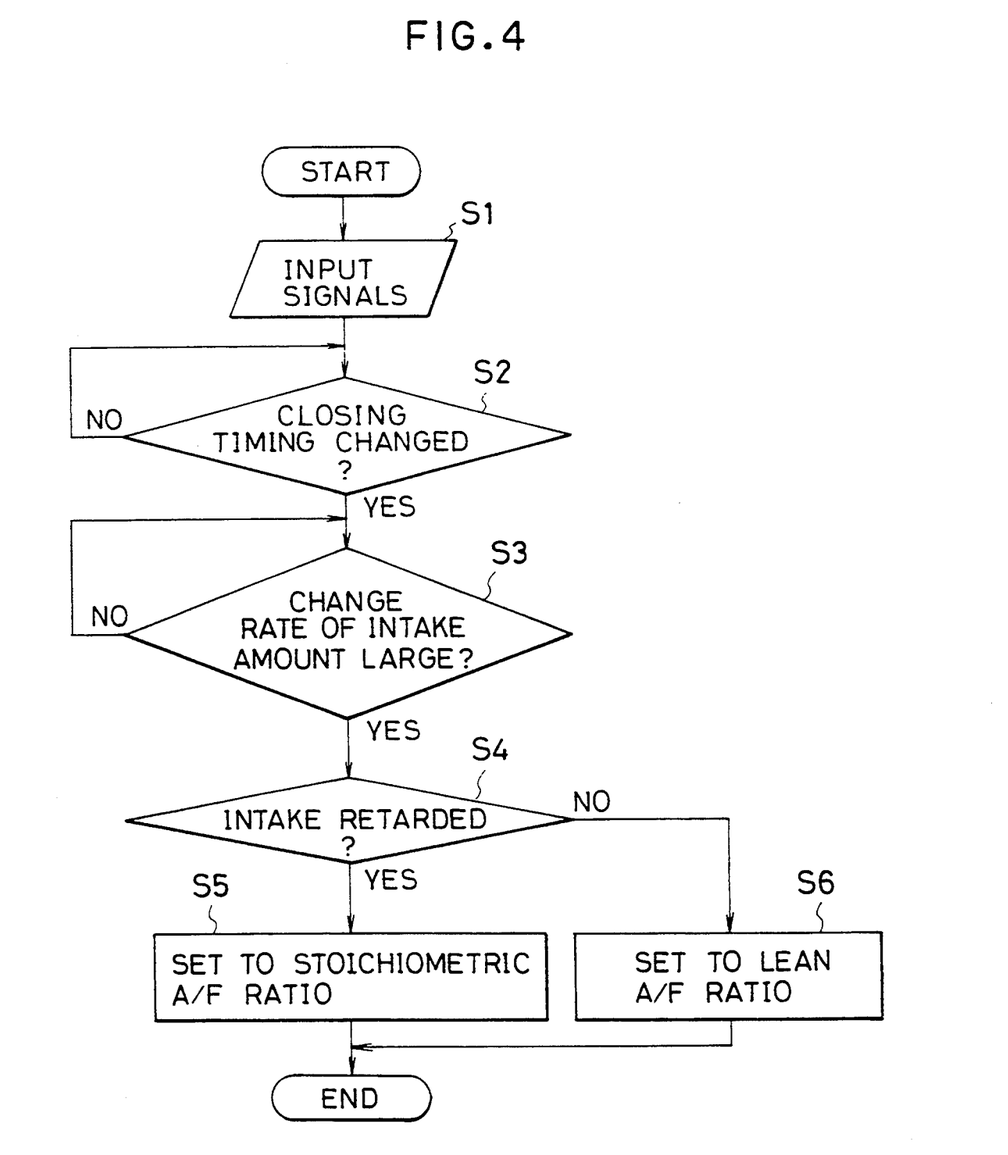
FIG. 4 is a flow chart showing an example of the control for changing the air-fuel ratios in the first embodiment of the present invention.

The control for changing the air-fuel ratios will now be described with reference to the flow chart as shown in FIG. 4.

First, at step S1, various signals are inputted, then followed by proceeding to step S2 at which it is decided to determine if the valve timing for the intake valve 103 has been changed. When the decision at step S2 gives an affirmative result, the program goes to step S3 at which it is decided to determine if a change rate of the amount of intake air is larger than a predetermined value. When the result of the decision at step S3 indicates that the change rate is larger than the predetermined value, the program goes to step S4 because the affirmative result of the decision at step S3 indicates the amount of charging has been supposed to increase on account of the changes of the timing for closing the intake valve 103. Then, at step S4, it is further decided to determine if the selected timing for closing the intake valve 103 is a retarded timing. When it is decided at step S4 that the valve timing for the intake valve 103 is retarded, it is determined that the timing exists in the region I so that, at step S5, the stoichiometric air-fuel ratio is set. On the other hand, when it is decided at step S4 that the valve timing for the intake valve 103 is not retarded, then the program flow goes to step 6 at which the lean air-fuel ratio is set because the negative result of the decision at step S4 indicates that the timing exists in the region II.

Figure 5:
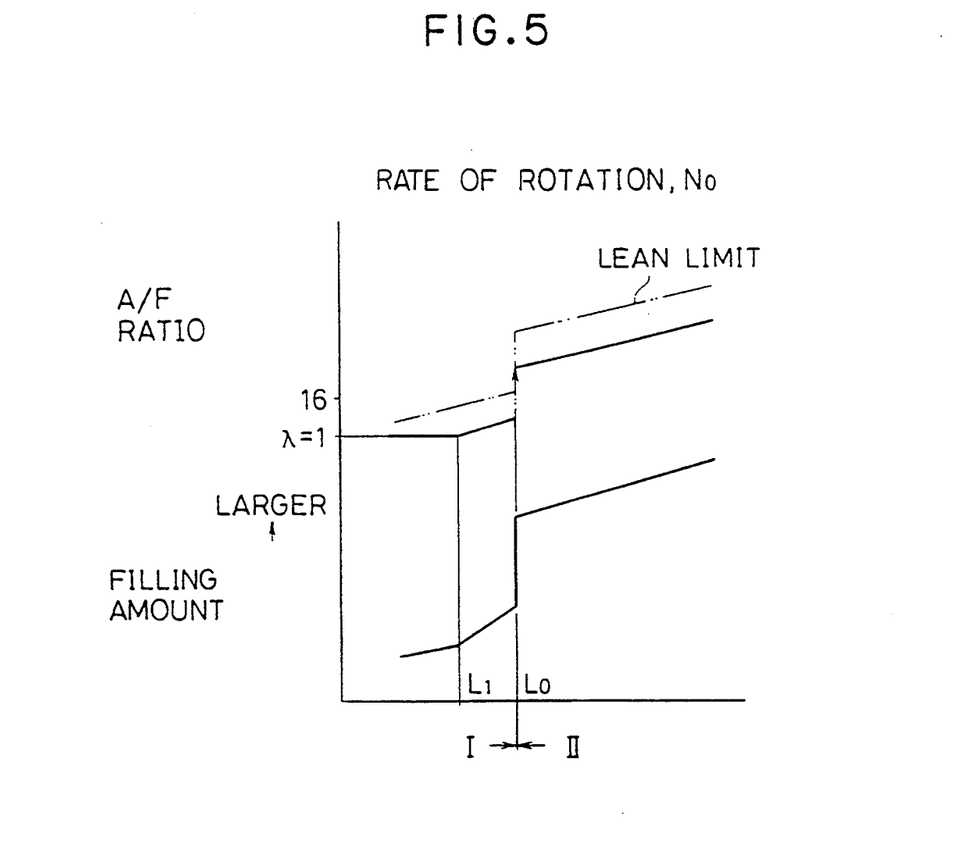
FIG. 5 is a characteristic diagram corresponding to FIG. 2 for the engine-control system according to a second embodiment of the present invention.

Second Embodiment (FIG. 5)

FIG. 5 is directed to the second embodiment of the engine-control system according to the present invention, in which the mechanical structure in the second embodiment is set in substantially the same manner as that in the first embodiment and the setting of the regions in the second embodiment is the same as that in the first embodiment and as shown in FIG. 2. Hence, the following is a description of the characteristic portion of the second embodiment.

In the second embodiment of the present invention, the air-fuel ratio is set in the region I so as to become leaner gradually when the load is set to be larger than the load L1 (L1<Lo) at which the combustibility becomes stable. The air-fuel ratio can be made leaner by adjusting the angle of an opening of the ISC valve 19 and by increasing the amount of intake air.

In addition, the air-fuel ratio is set so as to become leaner than an A/F=16, because of the increase in the amount of intake air.

The control of the air-fuel ratios in the second embodiment can improve mileage or fuel economy because the air-fuel ratio is made lean at an earlier timing. Further, the air-fuel ratio is set to become as lean as the A/F=16 as the air-fuel ratio at the load Lo, thereby reducing the amount of NOx within the exhaust gases. In other words, when the air-fuel ratio is made leaner than the A/F=16, the amount of NOx to be discharged from those engine becomes smaller, as is well known to the skilled in the art to which the present invention pertains. As a matter of course, it is desired that the air-fuel ratio at the load Lo be set as a value that can avoid a shock resulting from the changes in the timing for closing the intake valve 103.

Third Embodiment (FIGS. 6 to 11)

FIGS. 6 to 11 are directed to the third embodiment of the engine-control system according to the present invention, in which the engine involved in the third embodiment is a supercharged V-type 6-cylinder engine. In the third embodiment, although the same thing can be said of a fourth embodiment of the engine-control system according to the present invention, which follows, the engine-control system is characterized to a great extent in that an overlap period of time during which the intake valves and the exhaust valves are both open is so arranged as to be changed in accordance with the load of the engine. Further, it can be noted herein that the third embodiment is the same as the first and second embodiments in terms of a shift between the earlier timing and the retarded timing for closing the intake valves.

Figure 6:
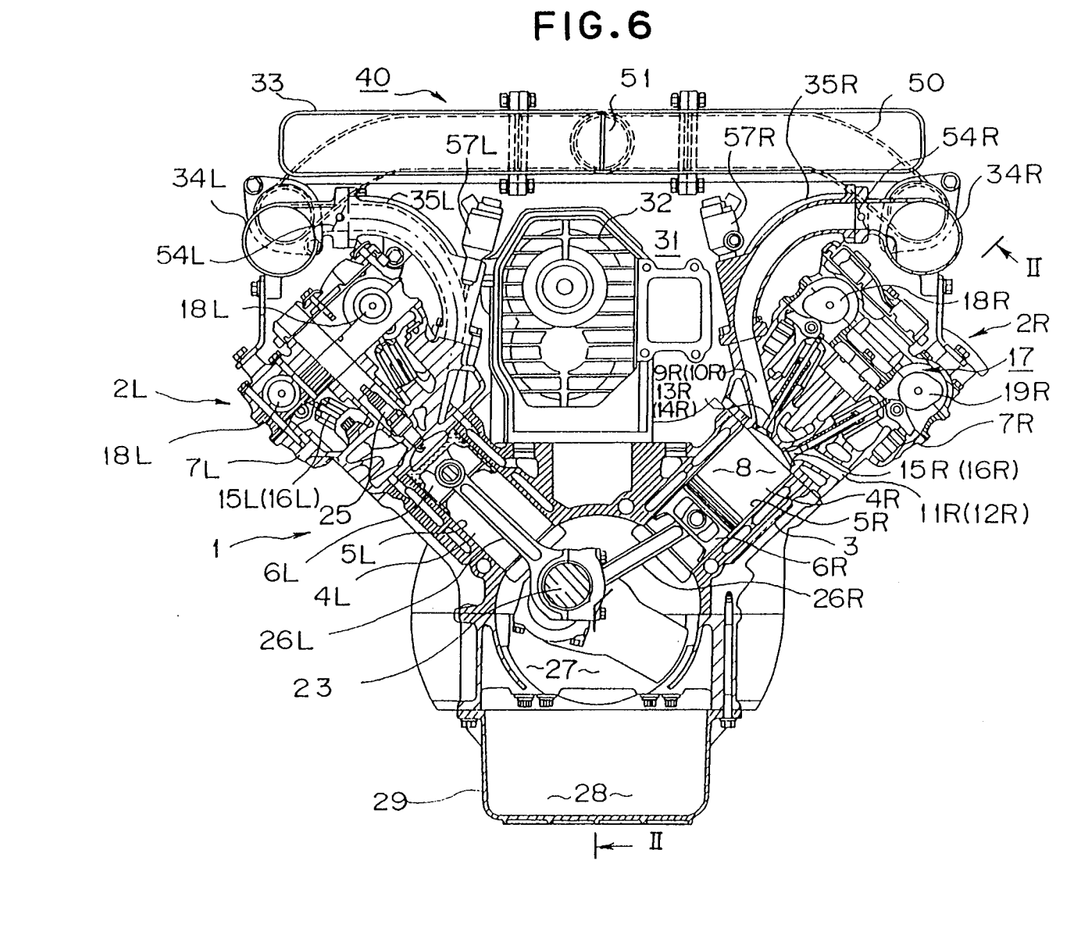
FIG. 6 is a partially sectional, front view showing an engine with a supercharger according to a third embodiment of the present invention.
Figure 7:
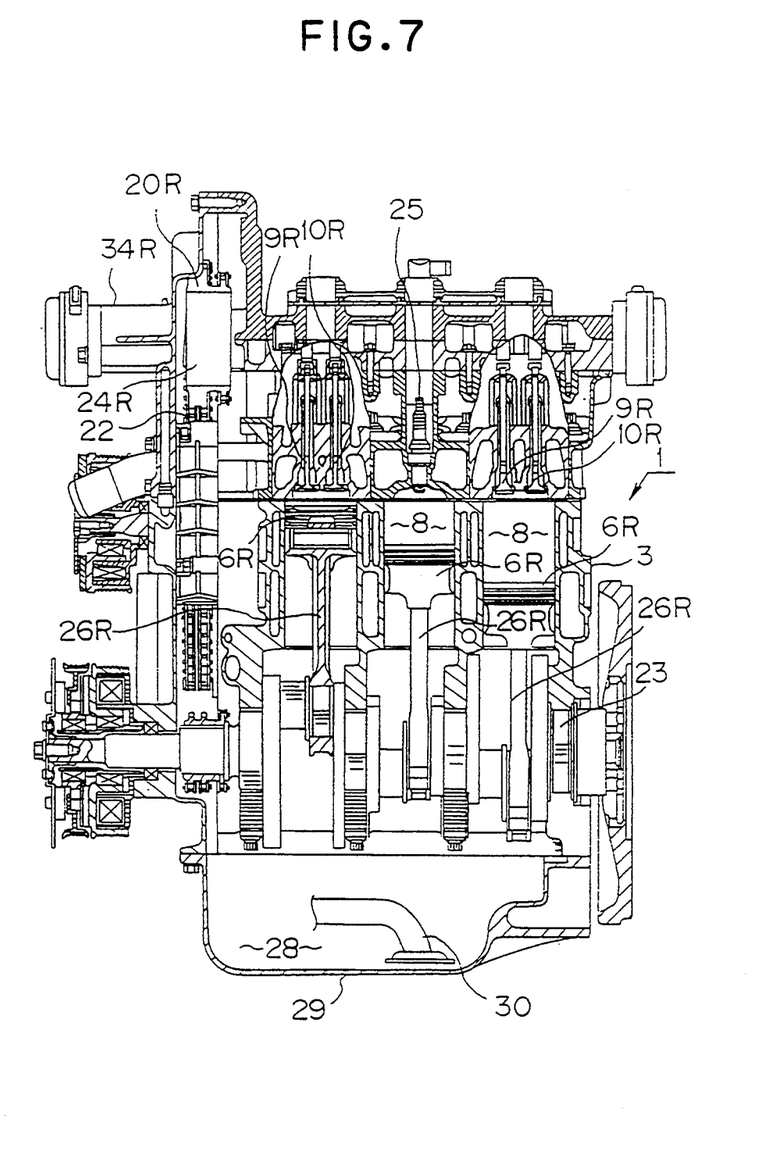
FIG. 7 is a sectional view when taken along line II—II of FIG. 6.

As shown in FIGS. 6 and 7, a body 1 of the engine has a left-hand bank portion 2L and a right-hand bank portion 2R arranged in a V-shaped relationship. Three cylinders, collectively referred to as 4, are arranged in each of the left-hand and right-hand bank portions 2L and 2R in line with each of the bank portions. In other words, the internal combustion engine to be employed for the third embodiment of the present invention is a so-called V-type 6-cylinder engine. In the description which follows, reference symbols "L" and "R" used as suffixes, as needed, are intended to mean "left-hand" and "right-hand", respectively.

A detailed description will be made of the body 1 of the engine. The body 1 of the engine has a cylinder block 3 and each of the cylinders 4 has a combustion chamber 8 of a penthouse type formed and delimited by a piston 6 inserted into a cylinder section 5 and a cylinder head 7. As specifically shown in FIG. 6, the cylinder head 7 is provided with first and second intake ports 9 and 10 as well as first and second exhaust ports 11 and 12, each having an opening at the combustion chamber 8. As further shown in FIG. 6, a first intake valve 13 is mounted to the first intake port 9 and a second intake valve 14 is mounted to the second intake port 10; and a first exhaust valve 15 is mounted to the first exhaust port 11 and a second exhaust valve 16 is mounted to the second exhaust port 12.

In other words, the body 1 of the engine to be employed in this embodiment of the present invention is a 4-valve type engine having two intake valves 13 and 14 and two exhaust valves 15 and 16 for each cylinder. A valve-operating system 17 for operatively opening and closing the valves 13–16 is of a so-called double overhead cam (DOHC) type, which has two cam shafts 18 and 19 accommodated in the cylinder head 7. In other words, the first cam shaft 18 is adapted to operatively open and close the intake valves 13 and 14, and the second cam shaft 19 is adapted to operatively open and close the exhaust valves 15 and 16. As shown in FIG. 7, each of the first and second cam shafts 18 and 19 is provided at its shaft end with a cam pulley 20 for the intake valve (although a cam pulley for the exhaust valve is not shown in the drawing). The cam pulley 20 is mechanically associated with an output shaft (a crank shaft) 23 of the engine through a timing belt 22, in a manner as is known to the art, thereby opening and closing the intake valves 13, 14 and the exhaust valves 15, 16 at a predetermined timing, in synchronization with the rotation of the output shaft 23 of the engine.

To the first cam shaft 18 is mounted a first valve timing change-over mechanism 24 (for the intake valves) for changing a phase of the first cam shaft 18 for the cam pulley 20 for the intake valves, and the second cam shaft 19 is provided with a second valve timing change-over mechanism (for the exhaust valves) for changing a phase of the second cam shaft 19 for the cam pulley for the exhaust valves, although not shown in the drawing. The second valve timing change-over mechanism for the exhaust valves has the same structure as the first valve timing change-over mechanism 24 for the intake valves so that a description of details of the second valve timing change-over mechanism will be omitted from the description which follows. To each of the cylinder heads 7 is mounted an ignition plug 25 so as to face or direct to the center of the combustion chamber 8.

The piston 6 is connected to the crank shaft 23 through a connecting rod 26, and a chamber 28 for reserving or storing engine oil is formed by an oil pan 29 in a region underneath a crank chamber 27 for accommodating the crank shaft 23. In FIG. 7, reference numeral 30 denotes an oil strainer.

As shown in FIG. 6, a central space 31 interposed between the left-hand bank portion 2L and the right-hand bank portion 2R is provided with a supercharger 32 of a screw type, capable of being mechanically driven by the force of rotation of the crank shaft 23. Above the supercharger 32 is mounted an intercooler 33. Above each of the left-hand and right-hand bank portions 2L and 2R is disposed a surge tank 34 extending lengthwise along the crank shaft 23. The surge tank 34 is connected to the intake ports 9 and 10 for each cylinder 4 through a discrete intake tube 35. As an upstream end of each of the intake ports 9 and 10 in the respective left-hand and right-hand bank portions 2L and 2R is disposed so as to open facing the central space 31 interposed between the bank portions, the discrete intake tube 35 is arranged in such a shape to first extend transversely from the surge tank 34 toward the central space 31 and then curve downward.

A detailed description will now be made of an intake system 40 for the body 1 of the engine with reference to FIG. 8.

The intake system 40 comprises a common intake tube 41, the left-hand surge tank 34L, the right-hand surge tank 34R, and the discrete intake tube 35, which are disposed and arranged in this order from the upstream side toward the downstream side. To the common intake tube 41 are disposed an air cleaner 42, an air flowmeter 43, a throttle valve 44, the supercharger 32 of the screw type, and the intercooler 33 in this order from the upstream side toward the downstream side. The common intake tube 41 has a first bypass 45 disposed so as to bypass the throttle valve 44, and a second bypass 46 disposed so as to bypass the supercharger 32 and the intercooler 33.

The first bypass 45 is provided with an ISC valve 47 which in turn can adjust the rate of idling rotation in a manner as is known to the art. The second bypass 46 has a relief valve 49 that can be driven with an actuator 48 of a diaphragm type to release the charged pressure by opening the relief valve 49 and opening the second bypass 46 when the charged pressure becomes higher than a predetermined level of pressure. On the other hand, the left-hand surge tank 34L is communicated with the right-hand surge tank 34R through a connecting tube 50 which in turn is provided in its intermediate position with a valve 51 for controlling intake air variably, for example, thereby opening and closing the valve 51 in accordance with the number of rotation of the engine and achieving the dynamic effect of intake air over a wide region in a manner as is known to the art.

The discrete intake tube 35 is provided with a partition wall 35a to thereby divide its internal space partially into left-hand and right-hand sections, i.e. a first discrete intake tube 52 and a second discrete intake tube 53. The first discrete intake tube 52 is connected with the first intake port 9, and the second discrete intake tube 53 is connected with the second intake port 10. The second discrete intake tube 53 is arranged to be opened or closed with a shutter valve 54 mounted at its upstream end portion. Each of the shutter valves 54L disposed in the left-hand bank portion 2L is connected with a common shaft 55L for the left-hand bank portion 2L, and each of the shutter valves 54R disposed in the right-hand bank portion 2R is connected with a common shaft 55R for the right-hand bank portion 2R. To a shaft end of each of the common shafts 55L and 55R is mounted an actuator (not shown). Each of the shutter valves 54L and 54R is arranged so as to be closed in the region where the number of engine rotation is lower than 3,000 rpm and so as to be opened in the region where the number of engine rotation is larger than 3,000 rpm.

A fuel supply system of the body 1 of the engine comprises an upstream injector 56 and a downstream injector 57, the upstream injector 56 being disposed immediately upstream of the supercharger 32 and the downstream injector 57 being disposed at the discrete intake tube 35 so as to face the first intake port 9 and the second intake port 10. In FIG. 8, reference numeral 58 denotes an assist air passage and reference numeral 59 denotes a check valve.

Figure 8:
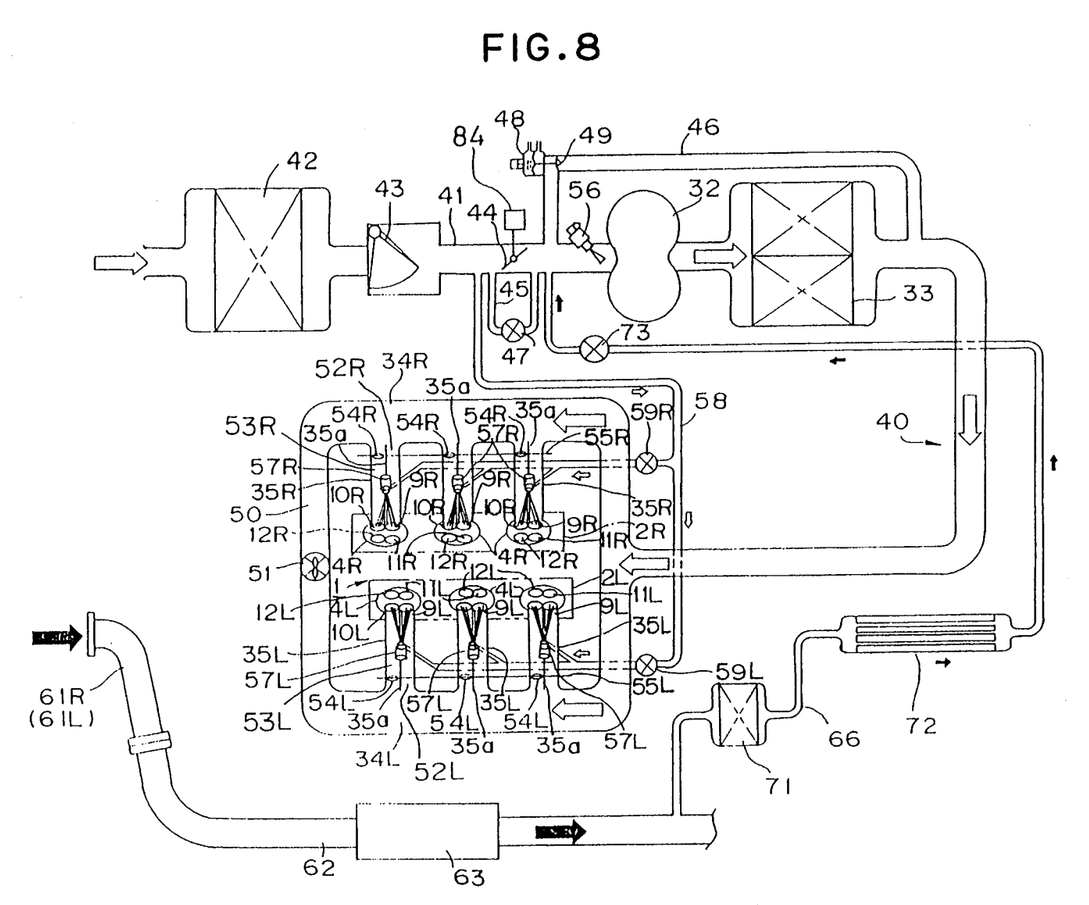
FIG. 8 is a diagrammatic representation of the engine as shown in FIG. 6.

As shown in FIG. 8, an exhaust system 60 of the engine comprises a left-hand exhaust manifold 61L for the left-hand bank portion 2L, a right-hand exhaust manifold 61R for the right-hand bank portion 2R, and a common exhaust tube 62, which are disposed in this order from the upstream side toward the downstream side. The common exhaust tube 62 is provided in its intermediate position with a catalytic converter 63 for purifying exhaust gases and at its downstream end with a silencer (not shown) in a manner as is known to the art.

The body 1 of the engine has an outer EGR passage 66 constituted by an outer EGR tube. The outer EGR passage 66 is connected at its one end to the common exhaust tube 62 on the downstream side of the catalyst converter 63 and at its other end to the common intake tube 42 on the upstream side of the supercharger 32 yet on the downstream side of the throttle valve 44. The outer EGR passage 66 is further provided with a carbon trap 71, an EGR cooler 72, and an EGR valve 73, and they are arranged in the order from the one end side to the other end side.

Figure 9:
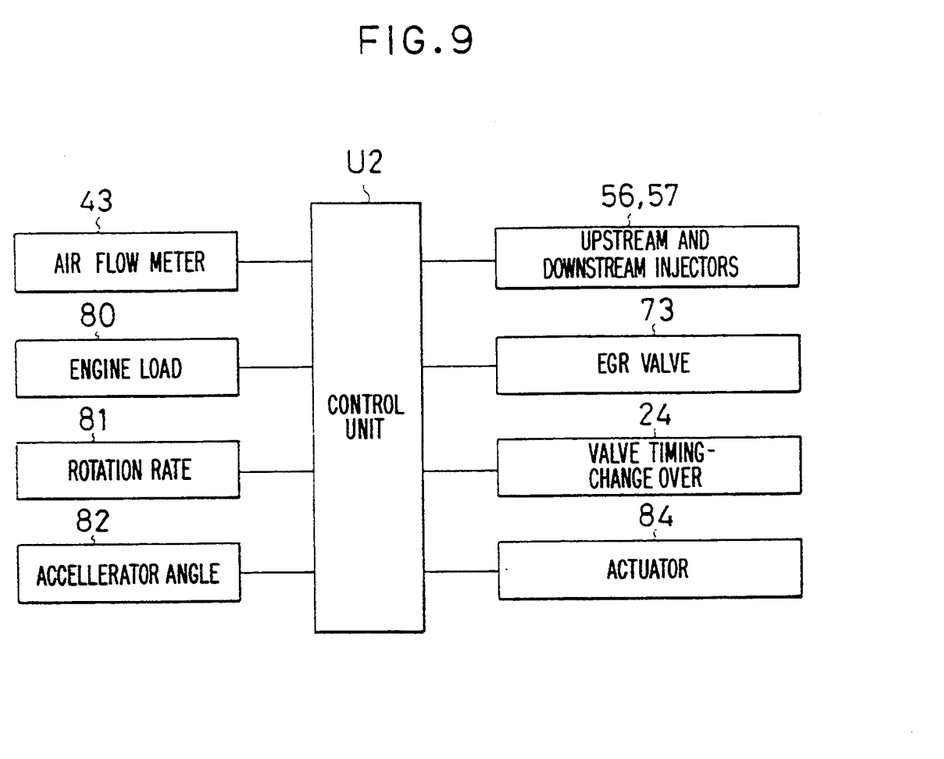
FIG. 9 is a schematic representation showing an entire outline of a control system according to the third embodiment of the present invention.

The engine has a control unit U2 as shown in FIG. 9. The control unit U2 is comprised of, for example, a microcomputer with a CPU, ROM, RAM, and so on built therein. Signals are entered into the control unit U2 from the air flowmeter 43 for sensing an amount of intake air, a sensor 80 for sensing a load of the engine on the basis of the negative pressure of intake air, a sensor 81 for sensing the rate of rotation of the engine, and a sensor 82 for sensing the angle of an opening of an accelerator. On the other hand, the control unit U2 generates control signals to the shutter valve 54, the upstream injector 56, the downstream injector 57, the EGR valve 73, the first valve timing change-over mechanism 24 for the intake and exhaust valves, the actuator 84 for driving the throttle valve 44, and so on.

Figure 10:
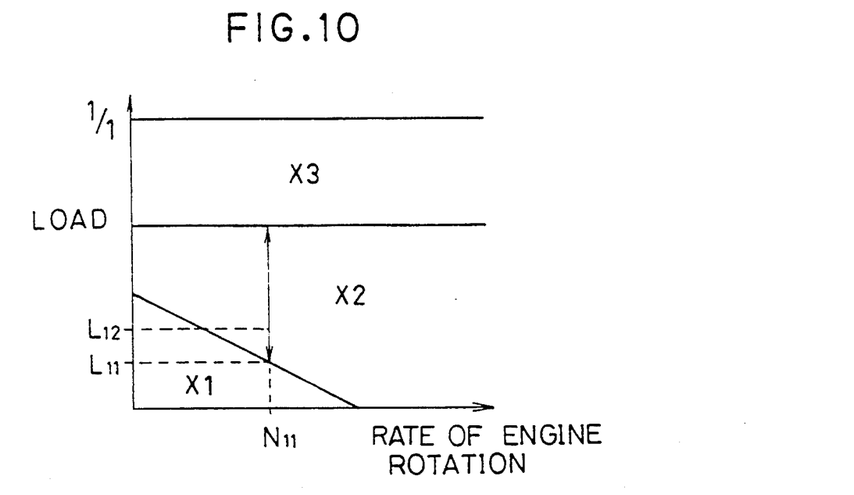
FIG. 10 is a control map to be employed for the engine-control system according to the third embodiment of the present invention.

Now, a description will be made of the control of the EGR, the valve timing, and the air-fuel ratio to be made by the control unit U2. The EGR control, the valve timing control, and the air-fuel ratio control can be made on the basis of the control map as shown in FIG. 10.

The region is divided into three regions X1, X2, and X3. The region X1 is set as a region where the load is low and the rate of engine rotation is low. The region X2 is set as a region where the engine is partially loaded. And, the region X3 is set as a region where the load is high. It should be noted herein that each of the EGR control, the valve timing control, and the air-fuel ratio control is made in each of the regions X1, X2, and X3.

EGR Control

The control of the EGR is made by closing the EGR valve 73 to a full extent to thereby inhibit the outer EGR in the regions X1 and X2, on the one hand, and by opening the EGR valve 73 to thereby recirculate EGR gases cooled by the EGR cooler 72 through the outer EGR passage 66 to execute a so-called cold EGR, on the other hand. This arrangement for the EGR can cool the inner temperature of the engine in the region X3, thereby reducing the amount of the NOx in the exhaust gases.

Valve Timing Control

A description will now be made of the control of the valve timing in the region X1 where the load is high and the rate of engine rotation is low, the region X2 where the engine is partially loaded, and the region X3 where the load is high. It should be noted herein that the region X2 corresponds to a region where the load is high. The valve overlap period of time (O/L) between the intake valve 13 (14) and the exhaust valve 15 (16) is set in a manner as will be described hereinafter by changing the valve timings of the intake valve 13 (14) and the exhaust valve 15 (16).

Region X1: The valve timings in the region X1 are set in such a manner that each of the intake valves 13 and 14 is opened at 10 deg before top dead center and each of the exhaust valves 15 and 16 is closed at 10 deg after top dead center. In other words, the valve overlap period of time (O/L) is set to a crank angle of 20°.

Region X2: The valve timings in the region X2 are set in such a manner that each of the intake valves 13 and 14 is opened at 25 deg before top dead center and each of the exhaust valves 15 and 16 is closed at 25 deg after top dead center. In other words, the valve overlap period of time (O/L) is set to a crank angle of 50°.

Region X3: The valve overlap period of time (O/L) in the region X3 is set in the same manner as in the region X2.

By changing the valve overlap period of time in the manner as described hereinabove, the residual gases remaining in the cylinders can be reduced during the smaller overlap period of time in the region X1 where the load is low and the rate of engine rotation is low, thereby ensuring stability in combustion. On the other hand, in the region X2 where the engine is partially loaded, the amount of NOx and a loss in pumping can be reduced by a large amount of the residual gases (the inner EGR) during the larger valve overlap period of time.

It can further be noted herein that the timing for closing each of the intake valves 13 and 14 is retarded in the region X1 and they are closed at an earlier timing in each of the regions X2 and X3, in the same manner as in the first embodiment. In this case, if the valve timings for closing the intake valves 13 and 14 are not changed, the difference in the timing for closing the valves between the retarded timing and the earlier timing is 15°, when calculated on the basis of the setting of the overlap period of time as described hereinabove. It is also possible to set the difference in the timing for closing the intake valves between the retarded timing and the earlier timing at approximately 30°, while setting the overlap period of time in the manner as described hereinabove.

Control of Air-fuel Ratio

The air-fuel ratio is set to become richer in the region X1 than in the region X2 in substantially the same manner in each of the first and second embodiments.

Figure 11:
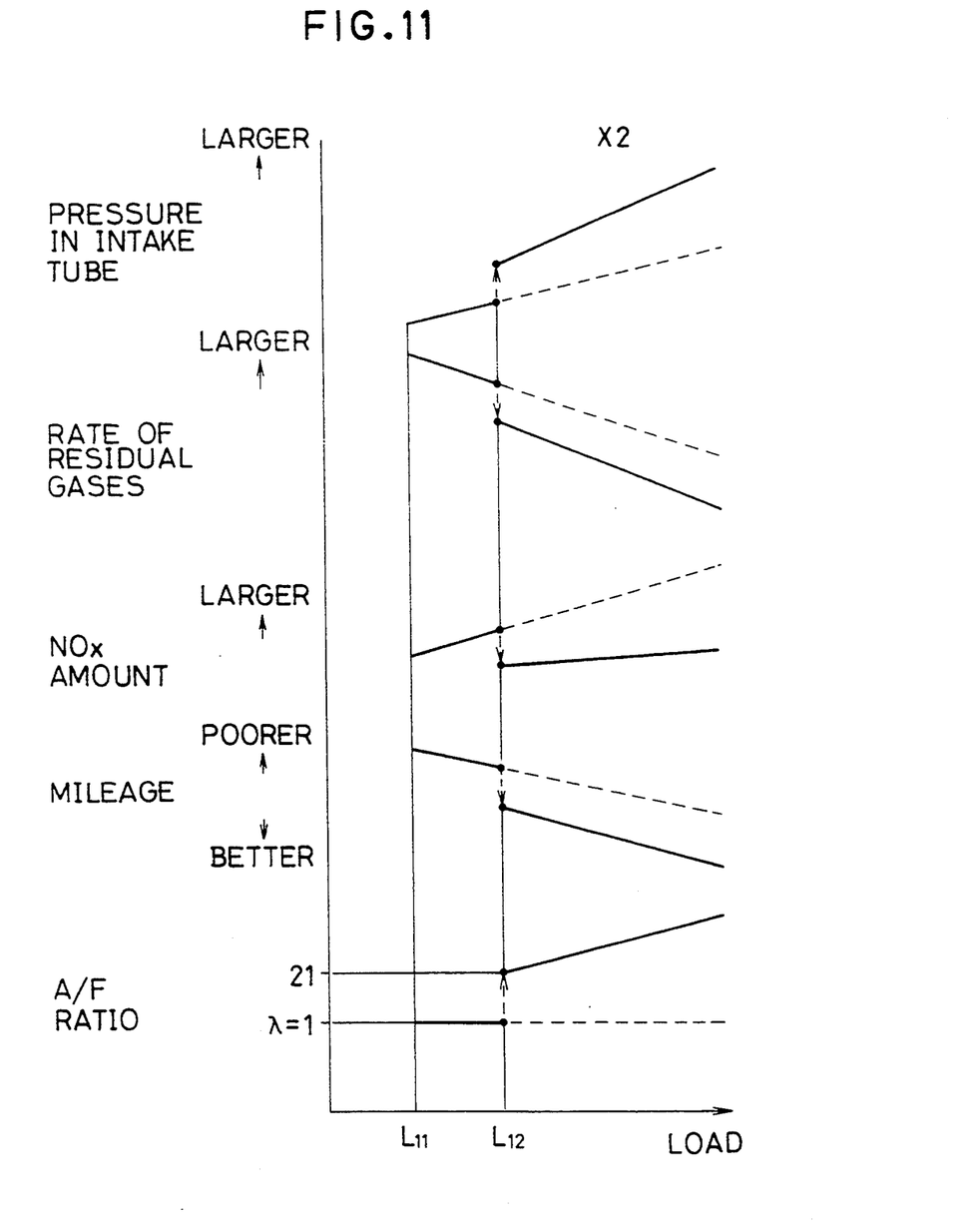
FIG. 11 is a graph showing the contents and the action of the control over the air-fuel ratios in accordance with the third embodiment of the present invention.

In the region X2 where the engine is partially loaded, the air-fuel ratio is set to the stoichiometric air-fuel ratio ($\lambda=1$) in a state in which the load of the engine is smaller than a predetermined load L12 and to A/F =21 at the predetermined load L12, as shown in FIG. 11 indicative of the characteristics at the rate of rotation, N11. In other words, when the load of the engine is larger than the predetermined load L12, the extent to which the air-fuel ratio is lean becomes larger gradually as the load becomes higher.

In the region X3, the extent to which the air-fuel ratio is lean may be increased in accordance with an increase in the load or the air-fuel ratio may be set to the stoichiometric air-fuel ratio ($\lambda=1$) by placing more importance upon the output of the engine.

The air-fuel ratio control to be made in the manner as described hereinabove can ensure a decrease in the amount of NOx and realize a good rate of fuel economy, in the region X2 where the engine is partially loaded, as indicated by the solid line in FIG. 11. In FIG. 11, it can be noted that broken line indicates the characteristics when the engine is driven at the stoichiometric air-fuel ratio in the state in which the load is equal to or higher than the predetermined load L12.

Figure 12:
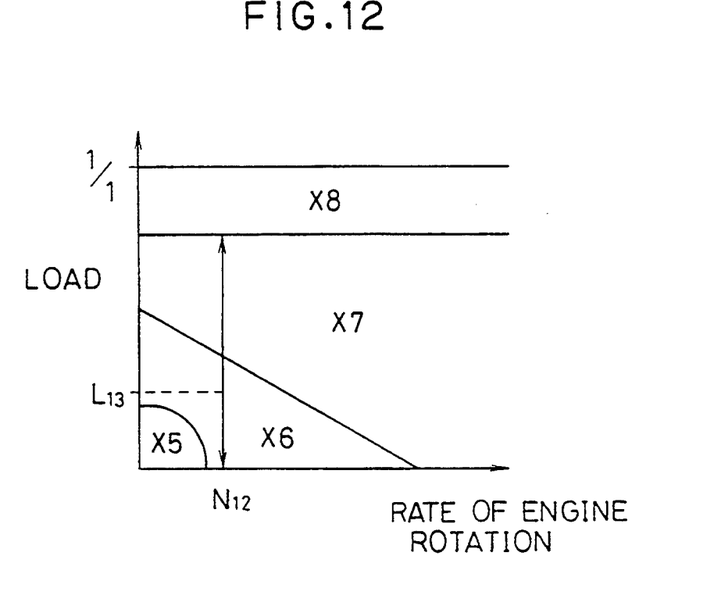
FIG. 12 is a control map corresponding to FIG. 10 to be employed for the engine-control system according to a fourth embodiment of the present invention.
Figure 13:
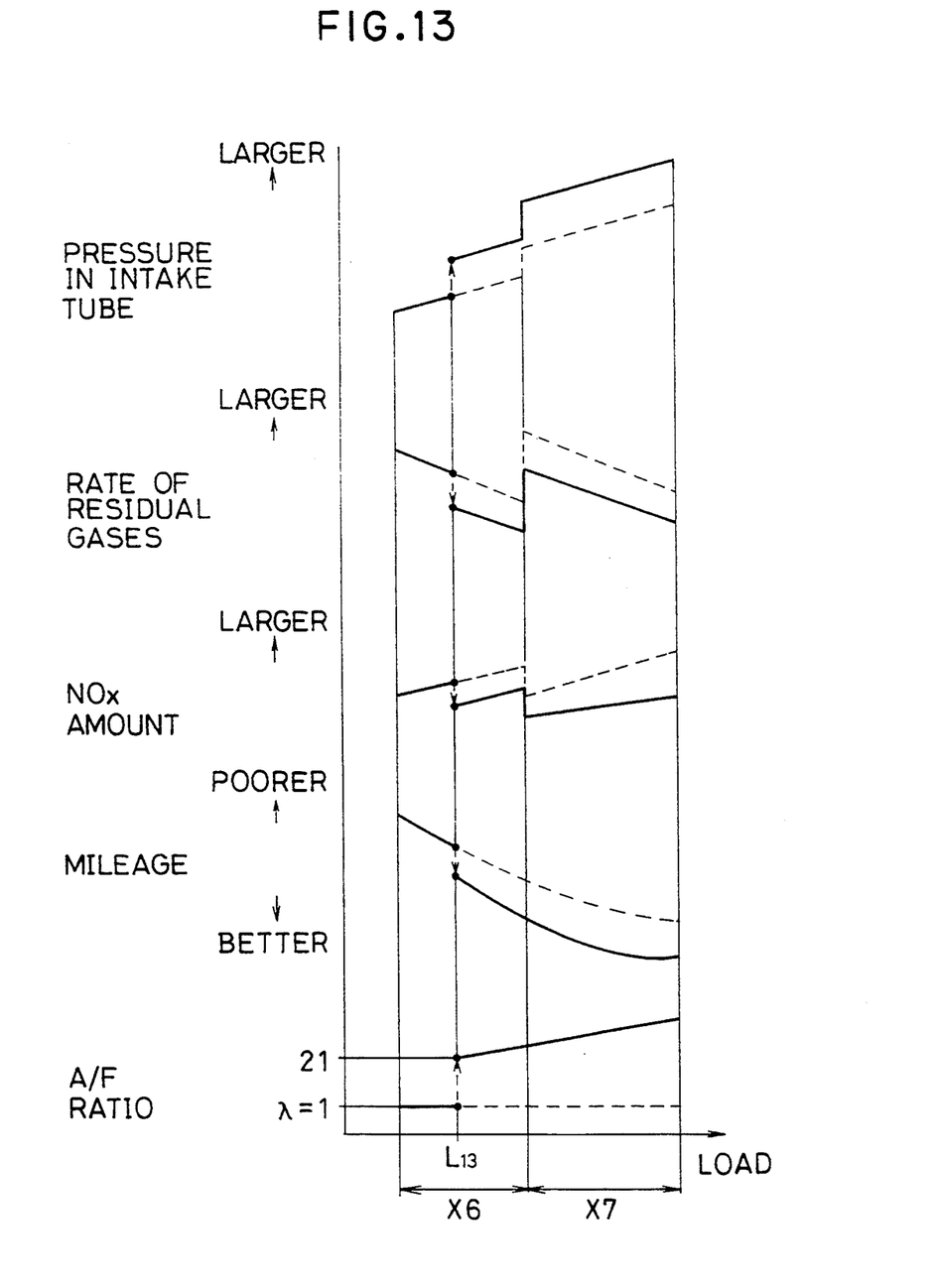
FIG. 13 is a graph showing the contents and the action of the control over the air-fuel ratios in accordance with the fourth embodiment of the present invention, corresponding to FIG. 11.

Fourth Embodiment (FIGS. 12 and 13)

FIGS. 12 and 13 are directed to the fourth embodiment of the engine-control system according to the present invention, in which the mechanical structure in the fourth embodiment is substantially the same as that in the third embodiment as shown in FIGS. 6 to 8.

In the fourth embodiment, the control map is divided into four regions, that is, a region X5 where the load is extremely low and the rate of engine rotation is extremely low, a region X6 where the load is low and the rate of engine rotation is low, a region X7 where the engine is partially loaded, and a region X8 where the load is high.

EGR Control

In the regions X5, X6, and X7, except for the region X8, the EGR valve 73 is brought into a fully closed state, thereby inhibiting the outer EGR. On the other hand, in the region X8, the EGR valve 73 is opened to allow cold EGR to be executed.

Valve Timing Control

In the regions X5, X6, and X7, except for the region X8, the valve overlap period of time (O/L) is set at the following values.

Region X5: In the region X5 where the load is extremely low and the rate of engine rotation is extremely low, each of the intake valves 13 and 14 is opened at 5 deg before top dead center and each of the exhaust valves 15 and 16 is closed at 5 deg after top dead center. In other words, the valve overlap period of time (O/L) may be set to a crank angle of 10°.

Region X6: In the region X6 where the load is low and the rate of engine rotation is low, each of the intake valves 13 and 14 is opened at 5 deg before top dead center and each of the exhaust valves 15 and 16 is closed at 30 deg after top dead center. In other words, the valve overlap period of time (O/L) may be set to a crank angle of 35°.

Region X7: In the region X7 where the engine is partially loaded, each of the intake valves 13 and 14 is opened at 30 deg before top dead center and each of the exhaust valves 15 and 16 is closed at 30 deg after top dead center. In other words, the valve overlap period of time (O/L) may be set to a crank angle of 60°.

By changing the valve overlap period of time in the manner as described hereinabove, the combustion can be ensured during the smaller valve overlap period of time in the region X5 where the load is extremely low and the number of engine rotation is extremely low, while capable of reducing the amount of NOx and a loss in pumping by a large amount of the residual gases (the inner EGR) during the larger valve overlap period of time in the regions X6 and X7.

It can further be noted herein that the timing for closing each of the intake valves 13 and 14 is retarded in each of the regions X5 and X6 and they are closed at an earlier timing in each of the regions X7 and X8. It can be noted herein that the difference in the timing for closing them between the retarded timing and the earlier timing can be set in the same manner as in the third embodiment.

Air-fuel Ratio Control

In the region X6 where the load is low and the rate of engine rotation is low, the air-fuel ratio is set to the stoichiometric air-fuel ratio ($\lambda=1$) when the load of the engine is smaller than a predetermined load L13, while the air-fuel ratio is set to A/F=21 at the predetermined load L13, as shown in FIG. 13 indicative of the characteristics at the rate of rotation, N12.

In the regions containing the region X7 where the engine is partially loaded, the extent to which the air-fuel ratio is lean becomes larger as the load becomes higher in a state in which the load is larger than the predetermined load L13.

Further, in the region X5, the air-fuel ratio may be set to the stoichiometric air-fuel ratio or an air-fuel ratio richer than the stoichiometric air-fuel ratio, for example, A/F=13.

The air-fuel ratio control to be made in the manner as described hereinabove can ensure a good effect upon a decrease in the amount of NOx and realize a good rate of fuel economy, in the region X6 where the rate of engine rotation is low and the load is low and in the region X7 where the engine is partially loaded, as indicated by the solid line in FIG. 13. In FIG. 13, it can be noted that broken line indicates the characteristics when the engine is driven at the stoichiometric air-fuel ratio in the state in which the load is equal to or higher than the predetermined load L13.

It should be understood herein that the foregoing text and description be interpreted to be not limitative in any respect, but to be illustrative, and any modifications, variants, and changes which do not depart from the scope and spirit of the invention be interpreted to be encompassed within the spirit and scope of the present invention.

For instance, the air-fuel ratio at the predetermined load L12 or L13 may be leaner than A/F=16.

Further, the supercharger 32 may be a turbocharger of a type capable of being driven by exhaust energy.

In addition, in each of the embodiments as described hereinabove, the changes in the air-fuel ratios in the region where the load is low or in the region where the load is high can be performed by appropriately selecting any mode as shown in FIGS. 3, 5, 11, and 13.

Furthermore, the engine to which each of the first and second embodiments is applied may be an engine with the supercharger. Further, the engine in each of the third and fourth embodiments may be a natural intake engine without any supercharger.

What is claimed is:

1. An engine-control system, comprising:
   load detecting means for detecting a load of the engine;

valve timing changing means for changing a timing for closing at least an intake valve;

air-fuel ratio adjusting means for adjusting an air-fuel ratio of mixed gases to be fed to the engine;

first control means for controlling said valve timing changing means in response to output from said load detecting means to thereby retard the timing for closing the intake valve in a region where the load is lower relative to the closing timing where the load is higher; and second control means for controlling said air-fuel ratio adjusting means in response to output from said load detecting means to thereby make the air-fuel ratio rich in the region where the load is lower relative to the fuel-air ratio where the load is higher.

2. An engine-control system as claimed in claim 1, wherein:
said air-fuel ratio in the region where the load is low is set to a rich air-fuel ratio equal to or richer than a stoichiometric air-fuel ratio; and
said air-fuel ratio in the region where the load is high is set to a lean air-fuel ratio leaner than the stoichiometric air-fuel ratio.

3. An engine-control system as claimed in claim 1, wherein said air-fuel ratio in the region where the load is low is set substantially constant regardless of a change of the load of the engine.

4. An engine-control system as claimed in claim 3, wherein said air-fuel ratio in the region where the load is low is set to the stoichiometric air-fuel ratio.

5. An engine-control system as claimed in claim 1, wherein said air-fuel ratio in the region where the load is low is set so as to vary with a change in the load of the engine.

6. An engine-control system as claimed in claim 5, wherein said air-fuel ratio in the region where the load is low is set to be leaner when the load of the engine is larger than a predetermined load than when the load thereof is smaller than the predetermined load.

7. An engine-control system as claimed in claim 6, wherein said air-fuel ratio in the region where the load is low is gradually varied to a leaner side in accordance with an increase in the load of the engine when the load of the engine is larger than the predetermined load.

8. An engine-control system as claimed in claim 6, wherein said air-fuel ratio in the region where the load is low is set to be substantially constant when the load of the engine is smaller than the predetermined load.

9. An engine-control system as claimed in claim 1, wherein said air-fuel ratio in the region where the load is high is set to vary gradually or continuously and variably to a leaner side in accordance with an increase in the load of the engine.

10. An engine-control system as claimed in claim 1, wherein an amount of fuel to be supplied is increased continuously and variably in accordance with an increase in the load of the engine, in a transient region between the region where the load is low and the region where the load is high.

11. An engine-control system as claimed in claim 1, further comprising:
intake air adjusting means for adjusting an amount of intake air;
wherein said second control means is adapted to control the air-fuel ratio by increasing the amount of intake air by said intake air adjusting means, so as to become relatively leaner when the load of the engine is larger than a predetermined load than when the load of the engine is smaller than the predetermined load in the region where the load is low.

12. An engine-control system as claimed in claim 11, wherein:
an intake passage of the engine is provided with a bypass for bypassing a throttle valve; and
said intake air adjusting means is composed of a control valve for adjusting an angle of an opening of the bypass.

13. An engine-control system as claimed in claim 11, wherein:
the air-fuel ratio is set to an air-fuel ratio equal to or richer than the stoichiometric air-fuel ratio when the load of the engine is smaller than the predetermined load in the region where the load is low; and
the air-fuel ratio is set to an air-fuel ratio leaner than the stoichiometric air-fuel ratio by controlling said intake air adjusting means and increasing the amount of intake air when the load of the engine is larger than the predetermined load.

14. An engine-control system as claimed in claim 1, wherein:
said valve timing changing means is further adapted so as to change a valve overlap period of time during which the intake valve and an exhaust valve are both open;
said first control means is further adapted to control said valve overlap period of time so as to become smaller in the region where the load is low than in the region where the load is high; and
said second control means is further adapted to control the air-fuel ratio so as to become leaner than an air-fuel ratio of 16 and so as to control the air-fuel ratio gradually to a leaner air-fuel ratio in accordance with an increase in the load of the engine, when the load of the engine becomes equal to or larger than the predetermined load in the region where the load is high.

15. An engine-control system as claimed in claim 14, wherein the air-fuel ratio in the region where the load is high is set to a rich air-fuel ratio smaller than an air-fuel ratio of 16 when the load of the engine is smaller than the predetermined load.

16. An engine-control system as claimed in claim 15, wherein the air-fuel ratio in the region where the load is high is set to the stoichiometric air-fuel ratio when the load of the engine is smaller than the predetermined load.

17. An engine-control system as claimed in claim 14, wherein the valve overlap period of time is set so as to vary by a crank angle of approximately 10° in the region where the load is low and to a crank angle of approximately 50° in the region where the load is high.

18. An engine-control system as claimed in claim 14, wherein the valve overlap period of time is set to a crank angle of 20° or larger in a region between the region where the load is low and the region where the load is high.

19. An engine-control system as claimed in claim 14, wherein said valve overlap period of time is set to a further smaller value in a region where the load of the engine is extremely low, that is, lower than the predetermined load, out of the region where the load is low.

20. An engine-control system as claimed in claim 14, wherein said valve overlap period of time is set to a further smaller value in a region where the load of the engine is extremely low, that is, where the load of the engine is lower than the predetermined load, out of the region where the load is low and in a region where the number of engine rotation is extremely low, that is, the number of engine rotation is lower than a predetermined value.

21. An engine-control system as claimed in claim 19, wherein said valve overlap period of time is set to approximately 60° in the region where the load is high, to approximately 10° in the region where the load of the engine extremely low, and to approximately 35° in the region where the load is low except for the region where the load of the engine is extremely low.

22. An engine-control system as claimed in claim 14, wherein the air-fuel ratio in the region where the load is high is set to a nearly constant level when the load is smaller than the predetermined load, on the one hand, and it is set to an air-fuel ratio of 16 or higher and the extent to which the air-fuel ratio is lean becomes larger gradually in accordance with an increase in the load of the engine when the load is larger than the predetermined load.

23. An engine-control system as claimed in claim 5, wherein the air-fuel ratio is so adapted as to vary continuously and variably in accordance with the load of the engine in the region where the load is low.

24. An engine-control system as claimed in claim 5, wherein the air-fuel ratio is so adapted as to vary stepwise and rapidly when the load of the engine exceeds the predetermined load in the region where the load is low.

25. An engine-control system as claimed in claim 1, wherein the air-fuel ratio is so adapted as to vary in accordance with a change in the load of the engine in the region where the load is high.

26. An engine-control system as claimed in claim 25, wherein the air-fuel ratio is so adapted as to vary continuously and variably in accordance with the load of the engine in the region where the load is high.

27. An engine-control system as claimed in claim 25, wherein the air-fuel ratio is so adapted as to vary stepwise and rapidly when the load of the engine exceeds the predetermined load in the region where the load is high.

28. An engine-control system as claimed in claim 1, wherein the air-fuel ratio is so adapted as to vary stepwise and rapidly in a region between the region where the load is low and the region where the load is high.

29. An engine-control system as claimed in claim 1, wherein the air-fuel ratio is so adapted as to vary continuously and variably in a region between the region where the load is low and the region where the load is high.

30. An engine-control system as claimed in claim 1, wherein:
  the air-fuel ratio is so adapted as to vary between a rich air-fuel ratio lower than an air-fuel ratio of 16 and a lean air-fuel ratio larger than an air-fuel ratio of 16 in the region where the load is low and in the region where the load is high; and
  the air-fuel ratio is so varied rapidly as to shorten a period of time during which an air-fuel ratio is in an air-fuel ratio of 16 when the air-fuel ratio is so changed as to pass through the air-fuel ratio of 16.

31. An engine-control system as claimed in any one of claims 1 to 30, wherein the engine is of a natural intake type.

32. An engine-control system as claimed in any one of claims 1 to 30, wherein the engine is of a supercharging type having a supercharger for charging intake air.

* * * * *